INVENTOR:
JAN CORNELISSEN
BY: Louis J. Bovasso
HIS ATTORNEY

INVENTOR:
JAN CORNELISSEN
BY: Louis J Bovasso
HIS ATTORNEY

United States Patent Office 3,454,165
Patented July 8, 1969

3,454,165
APPARATUS FOR THE SEPARATION OF VISCOUS COMPONENTS FROM A LIQUID
Jan Cornelissen, Hague, Netherlands, assignor to Shell Oil Company, New York, N.Y., a corporation of Delaware
Filed Dec. 21, 1967, Ser. No. 692,382
Claims priority, application Netherlands, Dec. 30, 1966, 6618398
Int. Cl. B01d 43/00, 17/10, 17/08
U.S. Cl. 210—522      10 Claims

ABSTRACT OF THE DISCLOSURE

Apparatus for separating viscous components from a liquid comprising a reservoir having liquid inlet means, viscous components outlet means at its lower end and liquid outlet means at its upper end. A movable separating plate assembly means is disposed within the reservoir and between the liquid inlet means and the outlet means for separating the viscous components from the liquid upon movement of the plate assembly means.

BACKGROUND OF THE INVENTION

Field of the invention

The invention relates to an apparatus for the separation of viscous components from a liquid. More specifically, the invention relates to the separation of thickened sludge from a polluted liquid, such as industrial or municipal waste water, muddy water and the like, in which, if desired, the concentration of the sludge to be separated can be increased previously by pre-settling and the like.

Description of the prior art

Liquids of this type generally have a certain consistency so that the separation by means of conventional filtering or centrifuging methods can only be carried out at considerable expense. This problem may arise, for example, in the case of sludge which has already been partly freed from water in settling tanks, settling basins, or in evaporators, and which still contain too much water for it to be treated, stored, processed or (in the case of waste products) discharged in an economically and technically attractive and safe way. The processing of sludge as a rule presents difficulties since no satisfactory results are obtained by merely allowing the sludge to settle. During settling, an initial layer of liquid is often formed above a body of sludge. The longer the sludge is allowed to settle, the larger the liquid layer becomes, but at the same time there is the undesirable side-effect that isolated channels which still contain liquid are left in the sludge so that the sludge is insufficiently freed from water. This undesirable side-effect becomes more marked as the sludge layer thickens. Measures should therefore be taken to ensure that the liquid remaining behind in the sludge ultimately finds its way into the liquid already separated, for example, water.

SUMMARY OF THE INVENTION

It is an object of this invention to provide apparatus making it possible for liquid remaining behind in a sludge layer to find its way into a separated liquid layer.

To this end, the apparatus according to the invention is characterized by a reservoir provided with an inlet for liquid to be treated and with an outlet for separated liquid and an outlet for the separated components, in which reservoir at least one assembly of parallel plates is arranged between the inlet and the outlets, the plates being at least substantially horizontal and one plate assembly being arranged to move in an at least substantially horizontal direction.

The effect of this is that movement of a plate assembly causes the separated sludge which has deposited on the plates during the passage of the polluted liquid through the plate assembly to be set in motion again so that the water present in isolated channels is liberated and enabled to flow upward and find its way into the liquid already separated. The horizontal movement in fact exerts additional pressure as a result of which extra liquid is forced in on one side of the assembly and liquid leaves the assembly on the opposite side. The outflowing liquid (water) which subsequently flows upward also carries along partly thickened sludge which will fall downward. Any sludge which has not reached the bottom of the reservoir will in a subsequent movement be collected again between the plates and be further freed from water there so that in a subsequent movement of the plate assembly the sludge will find its way to the bottom of the reservoir or at least between plates situated lower down. In this way the sludge is increasingly freed from water.

A simple, preferred embodiment is one which the reservoir has an at least substantially rectangular cross-section, the plate assembly in cross-section substantially fills the reservoir and the assembly and the reservoir are provided with elements which make the assembly movable in the longitudinal direction of the reservoir.

This embodiment has the advantage that the construction is simple and therefore inexpensive and permits an easy installation of the plate assembly. The movement may be effected for example by moving the assembly backwards and forwards on rails provided on the reservoir. It is of course possible to effect this movement in a variety of ways, for example by hand, but also mechanically and, if desired, fully automatically. It is possible, for example, to cause the assembly to be moved periodically, for example, by using a time clock, the period being dependent on the properties of the starting material, i.e., the polluted liquid. The height and the width of the plate assembly are geared to the height and the width of the reservoir. In this case, the height of the assembly is slightly less than the height of the reservoir so that during operation the entire assembly is immersed in liquid. Moreover, as will be clear, some space should be left between the bottom of the reservoir and the lower side of the assembly for collecting the separated sludge.

The plate assembly preferably fills at least half of the reservoir, measured in the longitudinal direction of the reservoir. One advantage of this is that, on completion of a horizontal movement, not all of the liquid present between the plates is forced out of the plate assembly. Consequently, some of the liquid already present between the plates remains behind between the plates, which prolongs the time available for the settling of sludge so that a better separation is obtained.

In another preferred embodiment of the apparatus according to the invention, one reservoir contains several plate assemblies. This is particularly advantageous if larger quantities of contaminated liquid have to be processed so that it is not necessary to use one large plate assembly. In this case it is sufficient to use two or more smaller plate assemblies, which, if necessary, can also be taken out of operation without the installation having to be shut down.

Another embodiment according to the invention is one in which the reservoir is cylindrical, is arranged at least substantially vertically, and is provided with a central shaft, the center line of which coincides with that of the cylindrical reservoir, the plates being arranged in the annular space between the shaft and the cylindrical reservoir wall and being movable round the vertical shaft.

This construction has the advantage that the plate assembly can now rotate in its entirety through the liquid in the reservoir, as a result of which fresh sludge is constantly deposited between the plates and increasingly freed there from water so that it settles increasingly rapidly on its way down through the reservoir. It is possible, for example, to rotate the plate assembly a quarter turn around the shaft and subsequently turn it back again after some time.

With this construction, the inlet may be arranged in such a manner that the liquid can enter the reservoir near the cylindrical reservoir shaft. The effect of this is that the liquid supplied is distributed evenly over the space in the reservoir.

Preferably several plate assemblies are spaced around the shaft of the reservoir at intervals which are at least substantially the same. Thus, three assemblies may be arranged at angles of 120° relative to each other or four assemblies may be arranged crosswise. By periodically moving the shaft over a section of its circumference under such conditions, a highly effective use is made of the available settling space.

According to the invention, the plates may be corrugated or have a zig-zag configuration, the tops and valleys of each plate extending in a direction normal to the direction of flow of the liquid and the respective tops and valleys of the various plates being situated vertically above each other. Strips in the form of gutters may be arranged before an end plane of the plate assembly extending normal to the direction of flow of the liquid, the main axis of each gutter lying in the vertical plane defined by the tops situated above each other. The effect of this is that the separated water issues into the gutters and is thus kept outside the liquid stream which flows into or out of the plate assembly. It is also possible to provide gutters for the discharge of thickened sludge; however, the advantages of providing gutters should be judged for each individual case. In the above-mentioned case of a cylindrical reservoir, the valleys of the plates in the upper half of the reservoir might for example be connected with gutters along which thickened sludge can be carried off. In this case, the tops of the plates in the lower half of the reservoir might be connected with gutters along which separated water can be carried off.

At or near the lower side of the plate assembly, the apparatus according to the invention is preferably provided with a scraper by means of which any thickened sludge can be scraped in the direction of the outlet for thickened sludge when the plate assembly is in motion. This will keep the bottom of the reservoir as far as possible free from thickened sludge.

The apparatus according to the invention may further contain a vibrator by means of which the plates can be caused to vibrate. In this way the isolated water channels in the sludge between the plates are also disturbed so that the above-mentioned horizontal movement of the plate assembly and the vibratory action co-operate towards the same end.

DESCRIPTION OF THE PREFERRED EMBODIMENTS

Figure 1:
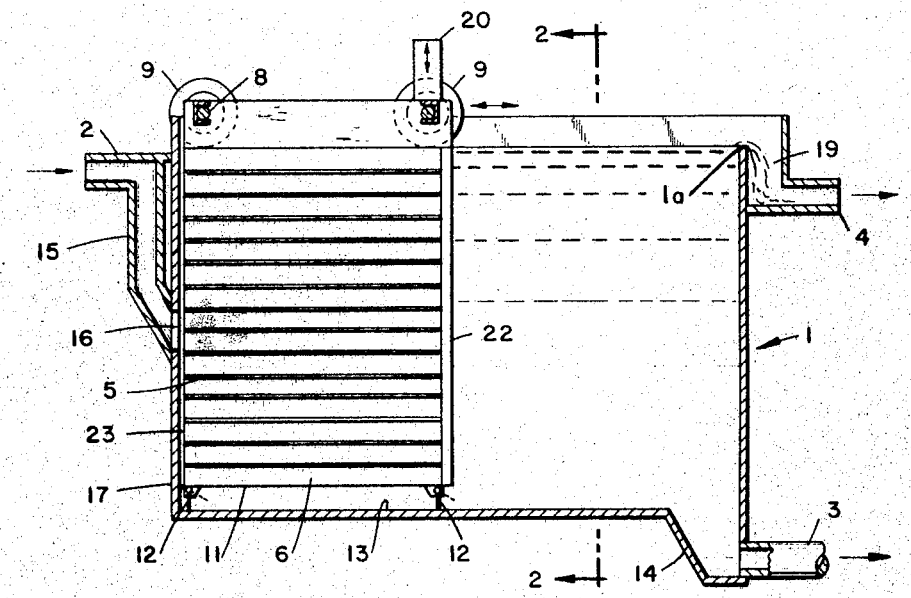
FIGURE 1 is a longitudinal sectional view of apparatus consisting of a rectangular reservoir provided with a plate assembly.

Referring to FIGURE 1, a preferably substantially rectangular reservoir 1 is shown having an inlet 2 for introducing liquid containing a sludge, as, for example, a polluted liquid. The reservoir 1 is provided with an outlet 3 at its lower end for removing thickened sludge from reservoir 1. An outlet 4 is provided on the upper end of reservoir 1 for discharging separated water from reservoir 1.

A plate assembly 5, including a plurality of interconnected parallel horizontally disposed plates 6, is located within reservoir 1. As can best be seen in FIGURE 2, assembly 5 has an upper portion 7 having axle stubs 8 extending therefrom. Axle stubs 8 engage wheels 9 which are rotatably mounted thereon. Wheels 9 roll on rails or tracks 10 integral with or otherwise fixed to the upper end of reservoir 1. As can also be seen in FIGURE 2, wheels 9 are disposed on each side of reservoir 1. Actually, a second set of wheels 9 may be aligned with the first set of wheels; this is illustrated in FIGURE 1 wherein a pair of wheels 9 are shown on a single track 10. The pair of wheels opposite the wheels 9 in FIGURE 1 has been omitted for convenience of illustration.

The lower end 11 of plate assembly 5 is provided with a plurality of scrapers 12 for scraping any thickened sludge disposed on the bottom 13 of assembly 1 towards the outlet 3. Two such scrapers 12 are illustrated in FIGURE 1; however, any number of scrapers may be provided depending on the quality of the sludge, the material of the scrapers, etc. Scrapers 12 are preferably rotatably or resiliently mounted on the assembly 5. A discharge section 14 extends from the bottom 13 of assembly 1 and is in communication with both the reservoir 1 and outlet 3.

The plate assembly 5 of FIGURE 1 preferably occupies approximately one-half of the internal space of reservoir 1. The length of reservoir 1 may be chosen so that accommodation is provided for several plate assemblies. In this manner, the total length of the chosen assemblies may approximate one-half the internal space of reservoir 1.

Inlet 2 (FIGURE 1) has a branch portion 15 in communication therewith discharging into the approximate central portion of assembly 1 through an opening 16 formed in a side wall 17 of assembly 1. A space 18 is disposed between the upper portion 7 of assembly 5 and the uppermost plate 6. This space 18 is in communication with a discharge outlet 19. Discharge outlet 19 is in communication with water outlet 4. A vibrating device 20 is mounted on or otherwise engages the upper portion 7 of assembly 5.

Figure 2:
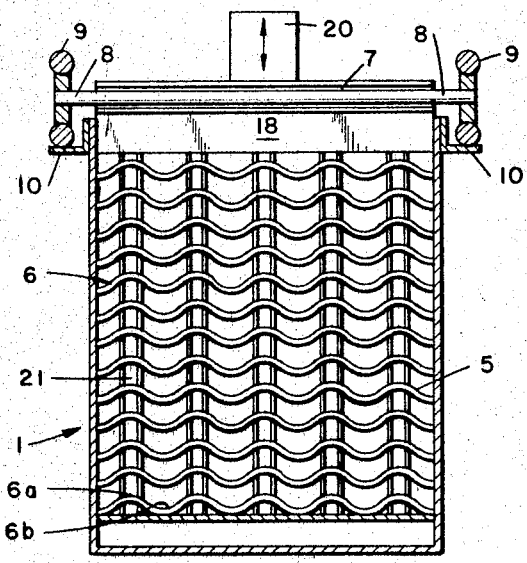
FIGURE 2 is a cross-sectional view taken on the line 2—2 of FIGURE 1.

Referring to FIGURE 2, the plates 6 can be seen to comprise a plurality of corrugated plates, each plate having tops 6a and valleys 6b extending in a direction normal to the direction of flow of liquid through the assembly 5 so that channels or gutters are thus formed extending in the direction of liquid flow. The respective tops 6a and valleys 6b of the various plates are situated vertically above each other. Moreover, plate assembly 5 is provided with gutters 21 which interconnect the tops 6a of the corrugated plates 6 for discharging any separated water as will be explained further hereinbelow.

In operation, the polluted liquid from which sludge is to be separated is introduced into reservoir 1 through inlet 2. If the assembly 5 is moved to the right from the position shown in FIGURE 1, the polluted liquid present in the reservoir 1 enters the assembly 5 at the right hand end plane 22 whereas liquid together with sludge leaves the assembly 5 at the left-hand end plane 23.

One portion of the sludge within the liquid begins to settle immediately upon being introduced into the plate assembly 5 through inlet 2. This sludge collects on the lowermost plates of plate assembly 5, whereas another portion of sludge moves upward under the influence of turbulent flow in the vicinity of the central portion of assembly 5 and collects on the topmost plates of plate assembly 5. The result of such a distribution is that the lowermost plates of assembly 5 contain relatively more sludge than the topmost plates, which is an advantage when the assembly 5 is moved to the right since, upon leaving the assembly 5 via the end plane 23, this thickened sludge travels only a short distance through the liquid before collecting on the bottom of the reservoir 1.

The separated water passes up through gutters 21 into reservoir 1 where it spills over the edge 1a of reservoir 1 and out of water outlet 4 as the plate assembly 5 is moved to the right in FIGURE 1. Scrapers 12 scrape thickened sludge towards discharge section 14 and out of sludge outlet 3. Vibrating device 20 is preferably actuated during the travel of assembly 5 so as to assist in the collection of sludge on the bottom of reservoir 1.

Plate assembly 5 may be moved by any prime mover means, hydraulic or pneumatic, mechanical or electrical. It may also be moved manually, as for example, by providing a handle on assembly 5.

Although this embodiment has been disclosed with reference to a polluted liquid, it may also be used in oily water service where sludge accumulates in the bottom of a parallel plate separator thereby presenting cleaning problems. In this application, the plate assembly is mounted on wheels running in the oily water below an oil seal cover with movement of the plates induced by cable means thereby providing continuous removal of solids from such separators.

Figure 3:
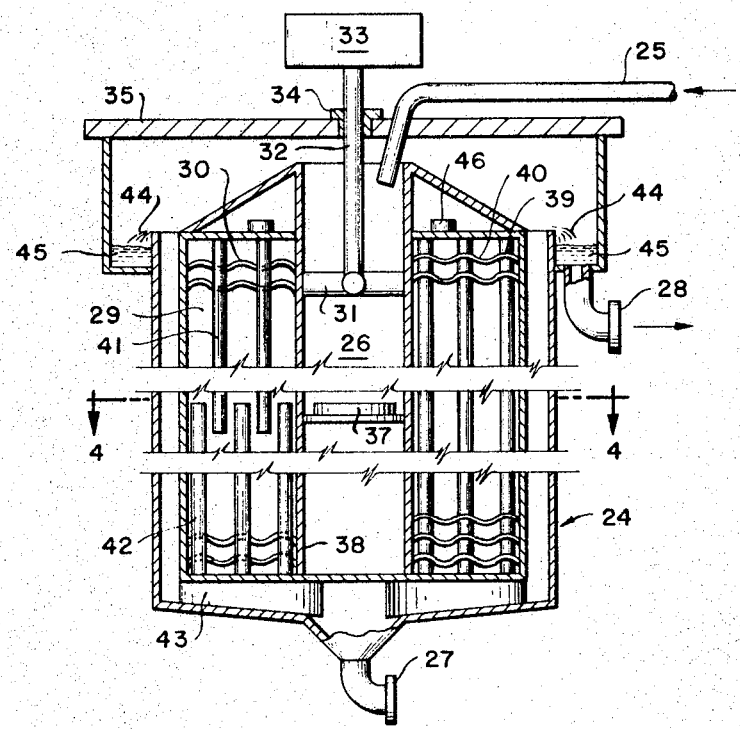
FIGURE 3 is a longitudinal sectional view of modified apparatus consisting of a cylindrical reservoir provided with two plate assemblies.
Figure 4:
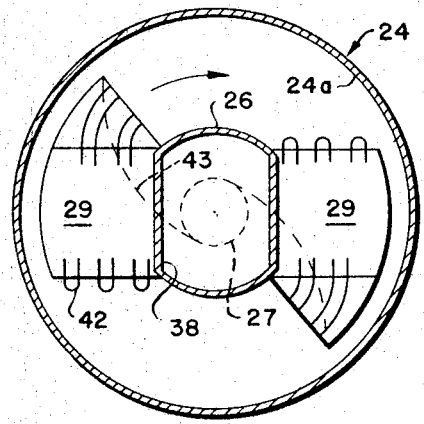
FIGURE 4 is a cross-sectional view taken on the line 4—4 of FIGURE 3.

Referring to FIGURES 3 and 4, a preferably cylindrical reservoir 24 is provided having an inlet 25 in communication with the central supply chamber 26 of reservoir 24. Portion 26 is disposed along the longitudinal axis of reservoir 24. Reservoir 24 further includes an outlet 27 at its lower end for removing thickened sludge and an outlet 28 at its upper end for removing separated water. A pair of assemblies 29 of interconnected horizontal plates 30 are arranged within reservoir 24. Assemblies 29 preferably have a substantially irregular pie-shaped cross-sectional configuration as can be seen in FIGURE 4. Assemblies 29 extend to inner wall 24a of reservoir 24 and are configured with relation to the inner wall 24a. The pair of assemblies 29 are interconnected by means of a connecting shaft or rod 31. A central shaft 32 rotatably engages connecting rod 31 and has a handle portion 33 for manual operation. Alternatively, other driving mechanism may be integral with or otherwise fastened to the free end of shaft 32. Accordingly, the prime mover means is similar to such means described previously in reference to the embodiment of FIGURES 1 and 2.

Central shaft 32 slidably passes through a bearing member 34 disposed in the upper wall 35 of reservoir 24. The longitudinal axis of shaft 32 coincides with the centerline of reservoir 24. In this manner, shaft can be rotated within reservoir 24 thereby rotating assemblies 29.

Thus, it can be seen that assemblies 29 are situated in the annular space formed between shaft 32 and inner wall 24a of reservoir 24. Central supply chamber 26 surrounds central shaft 32. The relationship of sludge inlet 25 is such that the liquid enters reservoir 24 near the shaft 32 as can be seen in FIGURE 3 via the central supply chamber 26 and through one or more apertures such as grooves 37 provided in the wall 38 of chamber 26. Grooves 37 communicate with the plates 30 disposed in assemblies 29.

The plates 30 are corrugated as in the embodiment of FIGURES 1 and 2. The tops 39 and valleys 40 of plates 30 extend in a direction substantially normal to the direction of flow of the liquid so that channels or gutters are thus formed which extend in the direction of flow of the liquid through grooves 37 into plates 30 as can be seen in FIGURE 4. The respective tops 39 and valleys 40 of the various plates 30 are situated vertically above each other. Gutters 41 interconnect valleys 40 of corrugated plates 30 and serve to discharge thickened sludge leaving the gutters 41 as can be seen in FIGURE 3. Gutters 41 are disposed only on the top half of the plates 30. The sludge leaves the gutters 41 on the lower side and collects on the bottom of reservoir 24.

The lower halves of plate assemblies 29 are provided with gutters 42 which interconnect the tops 39 of corrugated plates 30 and serve to discharge separated water leaving the gutters 42 on the upper side. The gutters 41 and 42 are seen only on the left assembly 29 of FIGURE 3; in actuality, gutters 41 and 42 are disposed in both assemblies as can be seen in FIGURE 4. These gutters 41 and 42 are located at the rear of the plates away from the point of engagement of the plates with the liquid within the reservoir as can be seen from the direction of the arrow in FIGURE 4. The lower ends of assemblies 29 are provided with scrapers 43 which are configured as shown in the dotted lines of FIGURE 4. In this manner, sludge on the bottom of reservoir 24 is scraped into outlet 27. It can be seen in FIGURE 3 that the bottom of reservoir 24 tapers inwardly towards outlet 27. Finally, each set of plates may include a vibrating device 46 operatively engaging the upper end of the plate assemblies for vibrating the plate assemblies as discussed previously concerning the embodiment of FIGURES 1 and 2.

In operation, the liquid containing a sludge is introduced into inlet 25 and into chamber 26. The liquid flows from chamber 26 through grooves 37 onto plates 30. While assemblies 29 are rotated through mechanism 33, thickened sludge enters gutters 41 and collects on the bottom of reservoir 24 where it passes into sludge outlet 27. Separated water enters gutters 28 and flows over the top edge 44 of reservoir 24 where it collects in an annular chamber 45 in communication with separated water outlet 28.

Although both embodiments have been disclosed as used to separate sludge from polluted water, it is possible to use the teachings of this invention to separate any viscous component from a liquid. One such example would be the case in the chemical industry during the processing of intermediate products where such viscous components are not considered to be impurities.

I claim as my invention:

1. Apparatus for the separation of viscous components from a liquid comprising:
   a reservoir adapted to contain a liquid having viscous components therein;
   liquid inlet means cooperating with said reservoir for introducing said liquid into said reservoir;
   viscous components outlet means disposed at the lower end of said reservoir and communicating with said reservoir for removing the viscous components of said liquid from said reservoir;
   liquid outlet means disposed at the upper end of said reservoir and communicating with said reservoir for removing liquid from said reservoir;
   movable separating plate assembly means comprising a plurality of interconnected horizontally disposed parallel plates located within said reservoir and disposed between said liquid inlet means and said viscous components outlet means for separating the viscous components from said liquid upon movement of said plate assembly means; and
   plate assembly means moving means operatively engaging said plate assembly means for moving said plate assembly means in a substantially horizontal direction longitudinally through said reservoir.

2. The apparatus of claim 1 wherein said plate assembly means comprises a plurality of corrugated plates, each plate having a plurality of tops and valleys extending in a direction substantially normal to the direction of flow of the liquid through the plate assembly means, the respective tops and valleys of each interconnected plate being situated vertically above each other.

3. The apparatus of claim 2 including gutter means interconnecting the tops of at least some of the plates for discharging liquid from the plates.

4. The apparatus of claim 1 wherein the plate assembly means includes viscous components scraping means adapted to engage viscous components on the bottom of said reservoir and scrape said components towards said viscous components outlet means upon movement of said plate assembly means.

5. The apparatus of claim 1 wherein said reservoir is substantially rectangular,
said plate assembly means occupying approximately one-half the internal space of said reservoir,
said liquid inlet means being disposed at one end of said reservoir and in communication with the central portion of said plate assembly means,
said liquid outlet means being disposed at the upper end of said reservoir opposite said liquid inlet means and in communication with liquid in said reservoir displaced by said movable plate assembly means, and
said viscous components outlet means being disposed at the lower end of said reservoir opposite said liquid inlet means and in communication with viscous components displaced by said movable assembly means.

6. The apparatus of claim 5 including vibrating means operatively engaging said plate assembly means and adapted to vibrate said plate assembly means.

7. Apparatus for the separation of viscous components from a liquid comprising:
a reservoir adapted to contain a liquid having viscous components therein;
liquid inlet means cooperating with said reservoir for introducing said liquid into said reservoir;
viscous components outlet means disposed at the lower end of said reservoir and communicating with said reservoir for removing the viscous components of said liquid from said reservoir;
liquid outlet means disposed at the upper end of said reservoir and communicating with said reservoir for removing liquid from said reservoir;
movable separating plate assembly means located within said reservoir and disposed between said liquid inlet means and said viscous components outlet means for separating the viscous components from said liquid upon movement of said plate assembly means;
said reservoir being a cylinder and having an inner and outer cylindrical wall;
said reservoir having a central supply chamber disposed along its longitudinal axis;
said liquid inlet means being in communication with said chamber;
said chamber having aperture means therein adapted to communicate with the central portion of said plate assembly means;
said plate assembly means comprising a plurality of sets of interconnected horizontal plates disposed in the annular space formed between the inner cylindrical wall and said chamber;
each set having a substantially irregular pie-shaped cross-sectional configuration and being substantially equally spaced from one another within said annular space; and
rotatable means operatively engaging said plate assembly means for rotating said plate assembly means about the longitudinal axis of said reservoir.

8. The apparatus of claim 7 wherein said plurality of interconnected horizontal plates comprises a plurality of corrugated plates,
each plate having a plurality of tops and valleys extending in a direction substantially normal to the flow of liquid from said chamber, through said aperture means and onto said plate assembly means, the respective tops and valleys of each interconnected plate being situated vertically above each other,
first gutter means interconnecting the valleys of the plates disposed in the upper portion of said reservoir for discharging liquid from the plates, and
second gutter means interconnecting the tops of the plates disposed in the lower portion of said reservoir for discharging liquid from the plates.

9. The apparatus of claim 8 wherein said reservoir includes an annular chamber in communication with both the upper portion of said plate assembly means and said liquid outlet means,
said viscous components outlet means being disposed along the longitudinal axis of said reservoir, and
the bottom of said reservoir being tapered inwardly towards said viscous components outlet means.

10. The apparatus of claim 8 wherein the plate assembly means includes viscous components scraping means adapted to engage viscous components on the bottom of said reservoir and scrape said components towards said viscous components outlet means upon rotation of said plate assembly means.

References Cited

UNITED STATES PATENTS

| | | | |
|---|---|---|---|
| 1,718,871 | 6/1929 | Nordell | 210—522 X |
| 2,573,615 | 10/1951 | Seailles | 210—521 |
| 3,346,122 | 10/1967 | Cornelissen | 210—522 |

FOREIGN PATENTS 994,118  8/1951  France.

REUBEN FRIEDMAN, *Primary Examiner.*
J. L. DE CESARE, *Assistant Examiner.*

U.S. Cl. X.R.
210—527, 528